United States Patent [19]

Briet

[11] Patent Number: 5,170,841
[45] Date of Patent: Dec. 15, 1992

[54] MULTI-WAY QUICK ACTION COUPLING DEVICE PARTICULARLY FOR MOTOR VEHICLE ENGINE COOLING CIRCUITS

[75] Inventor: Gilles Briet, Gueugnon, France

[73] Assignees: Hutchinson, Paris; Valeo Thermique Moteur, La Verriere, both of France

[21] Appl. No.: 776,092

[22] Filed: Oct. 11, 1991

Related U.S. Application Data

[62] Division of Ser. No. 492,648, Mar. 13, 1990.

[30] Foreign Application Priority Data

Mar. 15, 1989 [FR] France .................. 89 03380

[51] Int. Cl.$^5$ .................. F28F 9/00; F16L 39/00
[52] U.S. Cl. .................. 165/76; 165/176; 165/178; 165/78; 285/137.1; 285/921
[58] Field of Search .......... 165/176, 178, 76, 78; 285/137.1, 921, 302, 319

[56] References Cited

U.S. PATENT DOCUMENTS

| 4,610,284 | 9/1986 | Bertholomew | 285/921 |
| 4,679,827 | 7/1987 | Law | 285/921 |
| 4,696,496 | 9/1987 | Guelis et al. | 285/137.1 |
| 4,765,658 | 8/1988 | Reche | 285/137.1 |
| 4,786,085 | 11/1988 | Sauer et al. | 285/921 |

Primary Examiner—Albert W. Davis, Jr.
Attorney, Agent, or Firm—Bell, Seltzer, Park & Gibson

[57] ABSTRACT

A quick action coupling is disclosed for connecting simultaneously at least two pipes or hoses to the water box of a radiator or to the inlet and outlet members for the cooling fluid of a motor vehicle engine, said water box or said members comprising a generally cylindrical shaped chimney and n ways (n being a whole number at least equal to two) which open into said chimney, said coupling comprising n rigid conduits whose outlets into said connector are of a shape and position mating with the outlet orifices of said corresponding ways in the chimney of the water box or of said members so as to form n fluid circuits, as well as seals for sealing between the different fluid circuits with respect to each other comprising: a male connector of a form mating with said chimney; and sealing of said circuits with respect to the outside is provided by a single additional seal whatever the number n of circuits.

4 Claims, 6 Drawing Sheets

MULTI-WAY QUICK ACTION COUPLING DEVICE PARTICULARLY FOR MOTOR VEHICLE ENGINE COOLING CIRCUITS

This is a divisional of copending application Ser. No. 07/492,648 filed on Mar. 13, 1990.

BACKGROUND OF THE INVENTION

The invention relates to fluid circulation circuits, particularly cooling and/or heating circuits used in motor vehicles.

It relates in particular to a multi-way quick action coupling device, particularly for forming cooling circuits of motor vehicle engines, namely a circuit comprising essentially a radiator in which is cooled a liquid flowing around the cylinders of the engine, and a degassing tank serving also as expansion tank, vented or not depending on the type of construction. With such a circuit may be further associated an auxiliary radiator for heating the air for conditioning the living space of the vehicle, with a thermostatic valve and/or thermostat inserted in the liquid circuit between the engine and the main radiator for accelerating the temperature rise of the engine.

The different elements of the circuit are generally coupled together by pipes, such as hoses, fixed on their respective connectors by collars, the positioning of which is manual and consequently relatively long, whereas the general tendency in the motor vehicle industry is to reduce as much as possible the labour costs and, for this, to generalize as much as possible the use of controlled or independent robots.

In order to reduce the number of couplings and the length thereof, motor vehicle constructors and equipment suppliers have designed engine casings in which the cooling fluid inlet and outlet orifices are close together or several orifices close together in the case of a more complex circuit, as well as radiators whose inlet and outlet orifices, and possibly connection orifice to the degassing tank, are also grouped together so as to be situated close together and oriented so that their axes are parallel. A radiator has in particular been proposed whose "cold" and "hot" ends of the cooling fluid circuit open into a common water box, having a separating wall and having by construction two rigid adjacent connectors with parallel axes, whose free ends are fast with a common flange overmolded on a part of their surface. This radiator is connected to the engine by hoses joined together by flanges and, although fitting is simpler than that using collars, it nevertheless requires a seal inserted between two flanges and the positioning of nuts and bolts; tightening of the latter may cause leaks in a defective position of the seal and again requires manual action which is difficult to robotize.

The problem is then raised of providing a quick action coupling system between the elements forming the circuit, which does not have the drawbacks of known systems and which, furthermore, is adapted to be positioned in a manufacturing chain using one or more assembly robots.

SUMMARY OF THE INVENTION

A quick action coupling according to the invention, for connecting simultaneously at least two pipes or hoses to the water box of a radiator or to the inlet and outlet members for the cooling fluid of a motor vehicle engine, said water box or said members comprising a generally cylindrical shaped chimney and n ways (n being a whole number at least equal to two) which open into said chimney, said coupling comprising n rigid conduits whose outlets into said connector are of a shape and position mating with the outlet orifices of said corresponding ways in the chimney of the water box or of said members so as to form n fluid circuits, as well as seals for sealing between the different fluid circuits, is characterized in that it comprises:

a male connector of a form mating with said chimney; and in that sealing of said circuits with respect to the outside is provided by a single additional seal whatever the number n of circuits.

According to another feature of the invention, the rigid conduits each comprise at least one cylindrical portion, with its axis respectively parallel to the axis of the connector, the coupling further comprising:

sleeves in number at most equal to n for fixing one of the ends of each of said pipes or hoses respectively to the free cylindrical ends of said conduits, and means for clamping and locking by clipping said conduit on the chimney of the said water box or said cooling fluid inlet and outlet members.

A coupling according to the invention in which a single seal provides sealing with respect to the outside makes it possible to considerably reduce the risk of leaks in the circuit which it equips, this risk depending as is known on the power factor of the number of connection points.

According to another feature of the invention, the clamping and locking means are advantageously formed by at least two clips cooperating with diametrically opposite catches formed on the external surface of said chimney of the water box or of said inlet and outlet members for the cooling fluid of the engine.

In one embodiment, the external surface of said water box chimney or said members further has two diametrically opposite blind holes and the quick action coupling then comprises two diametrically opposite fingers forming means for rapidly aligning said chimney and the connector.

In an embodiment for connecting together two hoses only, said connector comprises two cylindrical portions having different external diameters, one of the rigid conduits of said coupling opening into the cylindrical portion of smaller diameter, while passing through that of larger diameter, whereas the other rigid conduit opens into the cylindrical portion of larger diameter.

In an embodiment for connecting three hoses between the engine, the radiator and a degassing tank of a motor vehicle cooling circuit, the connector comprises two cylindrical portions of different external diameters, two concentric chambers, one on the inside and the other peripheral, formed in the smaller diameter portion, one of the conduits intended to be connected to a hose of the radiator opening into the external larger diameter portion, the other conduit intended to be connected to the other hose of the radiator opening into the inner chamber of the external smaller diameter portion, while passing through the larger diameter portion, whereas the conduit to be connected to the degassing tank opens into the peripheral chamber.

According to yet another feature of the invention, the conduits which open into the internal chamber of the second portion have a common wall.

The invention also provides a device for forming a cooling fluid circulation circuit between the engine of a motor vehicle, the water box of the radiator of the vehicle and, if required, an auxiliary radiator, characterized in that it comprises at least two quick action couplings such as defined above, the hoses for the flow of said fluid having their ends fixed to the respective conduits of one and the other connectors by sleeves overmolded thereon.

The connectors and conduits are advantageously made from a hard plastic material, withstanding temperatures of about 100° C. without softening and are preferably molded in a single piece.

BRIEF DESCRIPTION OF THE DRAWINGS

Other features and advantages of the invention will be clear from the following description given by way of example with reference to the accompanying drawings in which.

DESCRIPTION OF THE PREFERRED EMBODIMENTS

Figure 1:
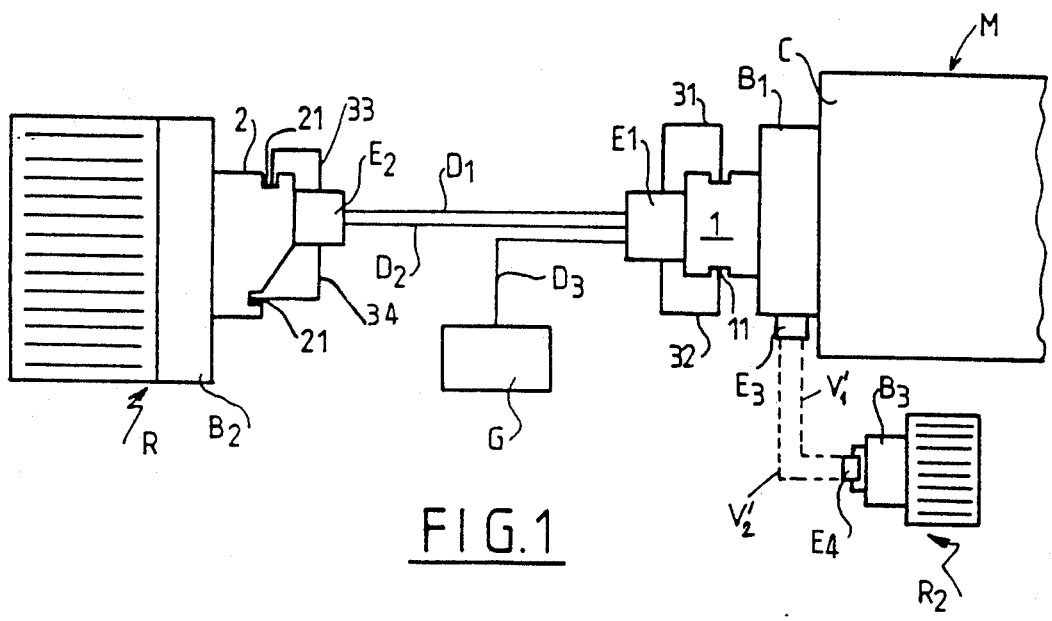
FIG. 1 is a schematic general view of a motor vehicle cooling circuit comprising connection devices in accordance with the invention.
Figure 6:
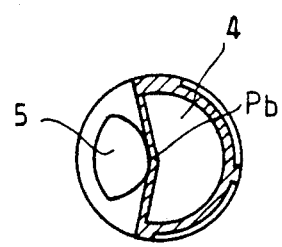
FIG. 6 is a sectional view through line VI—VI of FIG. 3.

Reference is made first of all to FIG. 1 which illustrates a device according to the invention for the quick action coupling of elements of a cooling fluid circuit of a motor vehicle. In this Figure, the casing C of engine M is fitted with a water box B having a connector 1 with, on its external surface, notches or depressions 11 and the water box $B_2$ of the main radiator R comprises a connector 2 with, on its external surface, notches or depressions 21. Between engine M, the main radiator R and the degassing tank G are disposed two main hoses $D_1$ and $D_2$ and a secondary hose $D_3$ of a smaller diameter than the preceding ones and which is fitted between engine M and the degassing tank G. To connect the ends of hoses $D_1$, $D_2$ and $D_3$ to engine M, the invention uses a first multi-way quick action coupling $E_1$, whereas to connect hoses $D_1$ and $D_2$ to the main radiator R, the invention uses a second multi-way quick action coupling $E_2$, the external surfaces of the two couplings being provided with clips 31, 32 and 33, 34 which engage resiliently in the depressions 11 and 21 respectively. Coupling $E_1$ is a three-way coupling for fitting hoses $D_1$, $D_2$ and $D_3$, the latter being connected to the degassing tank G by a collar or similar means.

Similarly to what has just been described, the water box $B_3$ of a heating radiator $R_2$ is connected to the water box $B_1$ of engine M by two quick action couplings $E_3$, $E_4$ having only two ways.

These devices make it possible to connect the radiator R simply and rapidly to the engine by aligning the axis of coupling $E_1$ with that of connector 1 of the water box $B_1$ and locking by clipping clips 31 in the depressions 11 and by similarly aligning the axis of coupling $E_2$ with that of connector 2 of water box $B_2$ of radiator R and locking clips 33 and 34 in depressions 21. Connection of radiator R to the engine is thus provided by simply aligning two axes and positioning of two clips instead of fitting four collars as required in known assemblies.

It goes without saying that the above described arrangement of the engine, water box, radiator and coupling device is in no wise limitative of the invention, since the latter also finds an application in three-way quick action couplings to the radiator, or two-way quick action couplings to each of the elements forming the circuit, or even other constructions.

Reference will now be made to FIGS. 2 to 7 which show in greater detail, respectively in an external view (FIGS. 2 and 7) and sectional views, the quick action coupling $E_1$ of the invention. This coupling has three conduits with parallel axes 3, 4, 5 which open into a male connector 10, the conduits and the connector forming a single piece advantageously by molding a plastic material chosen so as to withstand the temperatures of the cooling circuit fluid and the conditions prevailing under the engine bonnet of a motor vehicle. Hoses $D_1$, $D_2$, $D_2$ are mounted on the ends with circular cross section 3a, 4a and 5a respectively of the conduits opposite connector 10 by plastic material molded portions 23, 24 and 25. Conduits 3 and 4, on the one hand, and 4 and 5 on the other have common walls Pa, Pb respectively, over a part of their length opposite their ends connected to the hoses and, whereas conduit 4 further comprises a wider portion in the vicinity of the connector, conduits 3 and 5 have evolutive sections (FIG. 6) so that the free ends of the three conduits are separated for fitting the hoses.

Figure 3:
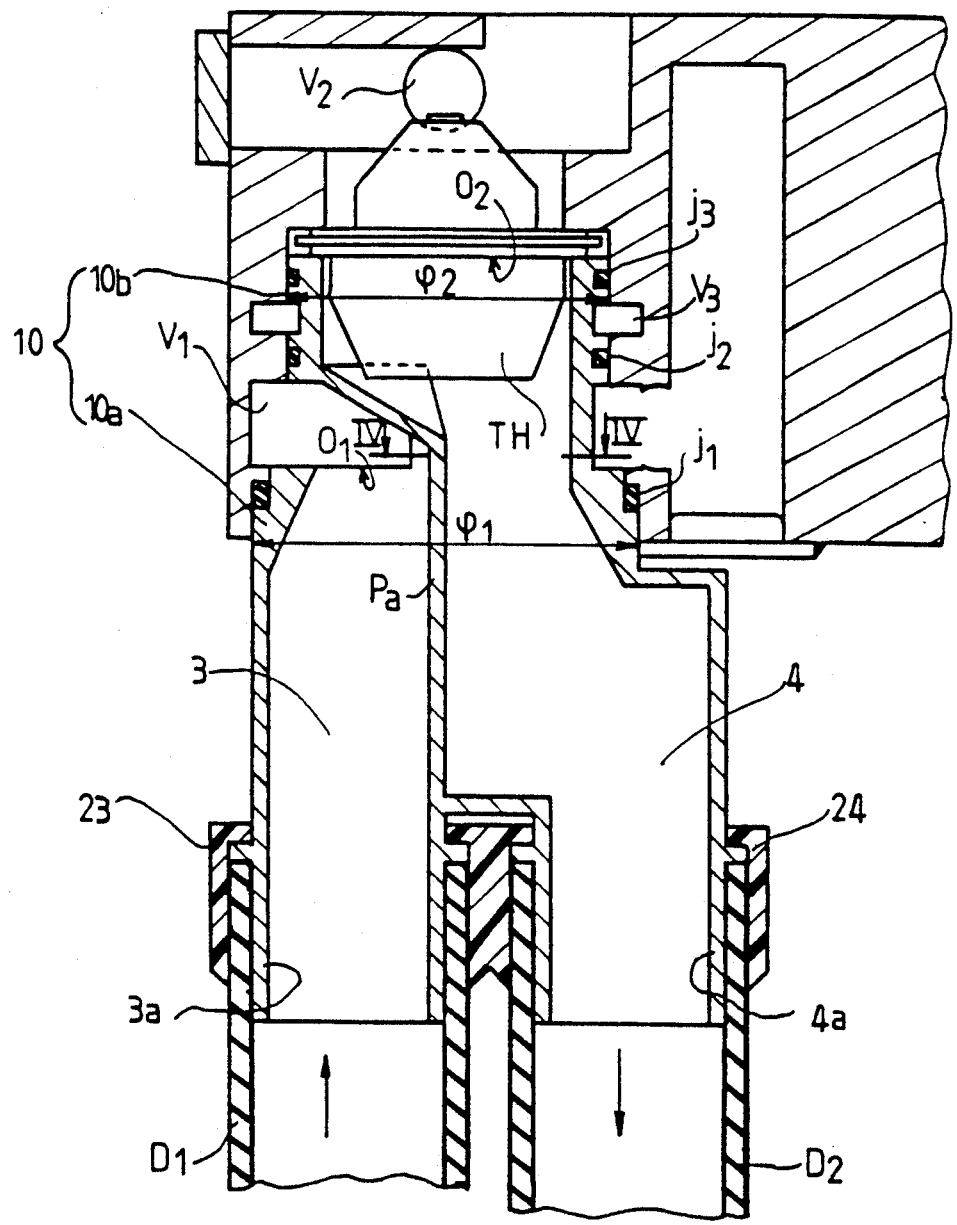

As is clear in FIG. 3, connector 10 comprises a first portion 10a having an external diameter $\phi 1$ and a second portion 10b having an external diameter $\phi 2$ less than $\phi 1$, in which is formed an internal chamber 12a and a peripheral chamber 12b. In the embodiment described and shown, conduit 3 is the one bringing fluid to the engine and it opens into the first portion 10a of the connector through an orifice $O_1$ which forms the orifice communicating with the corresponding way $V_1$ of the water box $B_1$ of the engine. Similarly, conduit 4 which is the one for returning hot fluid to the radiator passes through portion 10a through a semi-conical, semi-cylindrical connection zone and opens into the internal chamber 12a through an orifice $O_2$ which forms the orifice of conduit 4 communicating with the corresponding way $V_2$ of box $B_1$. Conduit 5, FIG. 4, which is the one for degassing also passes through portion 10a and opens into chamber 12b which has, on its external periphery, peripheral orifices or apertures $O_3$ which form the orifices of conduit 5 communicating with a circular groove g which forms part of the degassing way $V_3$ in box $B_1$, in communication with the top point of the water circuit of the engine.

O-seals $j_1$, $j_2$, $j_3$ are placed in grooves formed for this purpose on the external surface of the male connector 10.

Figure 7:
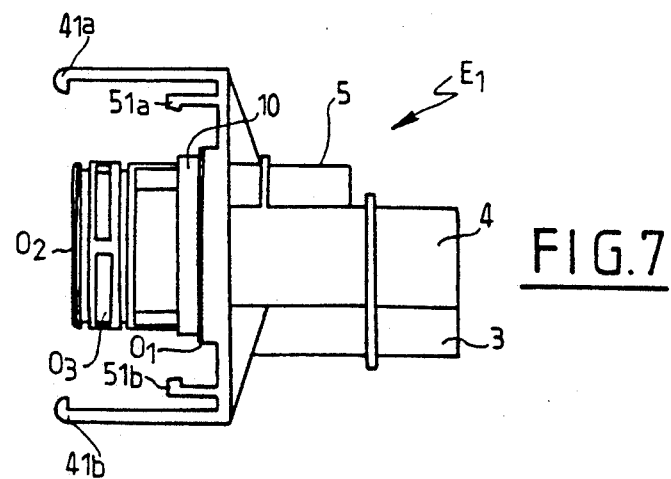
FIG. 7 is a plan view of the quick action coupling of FIG. 2, alone.
Figure 2:
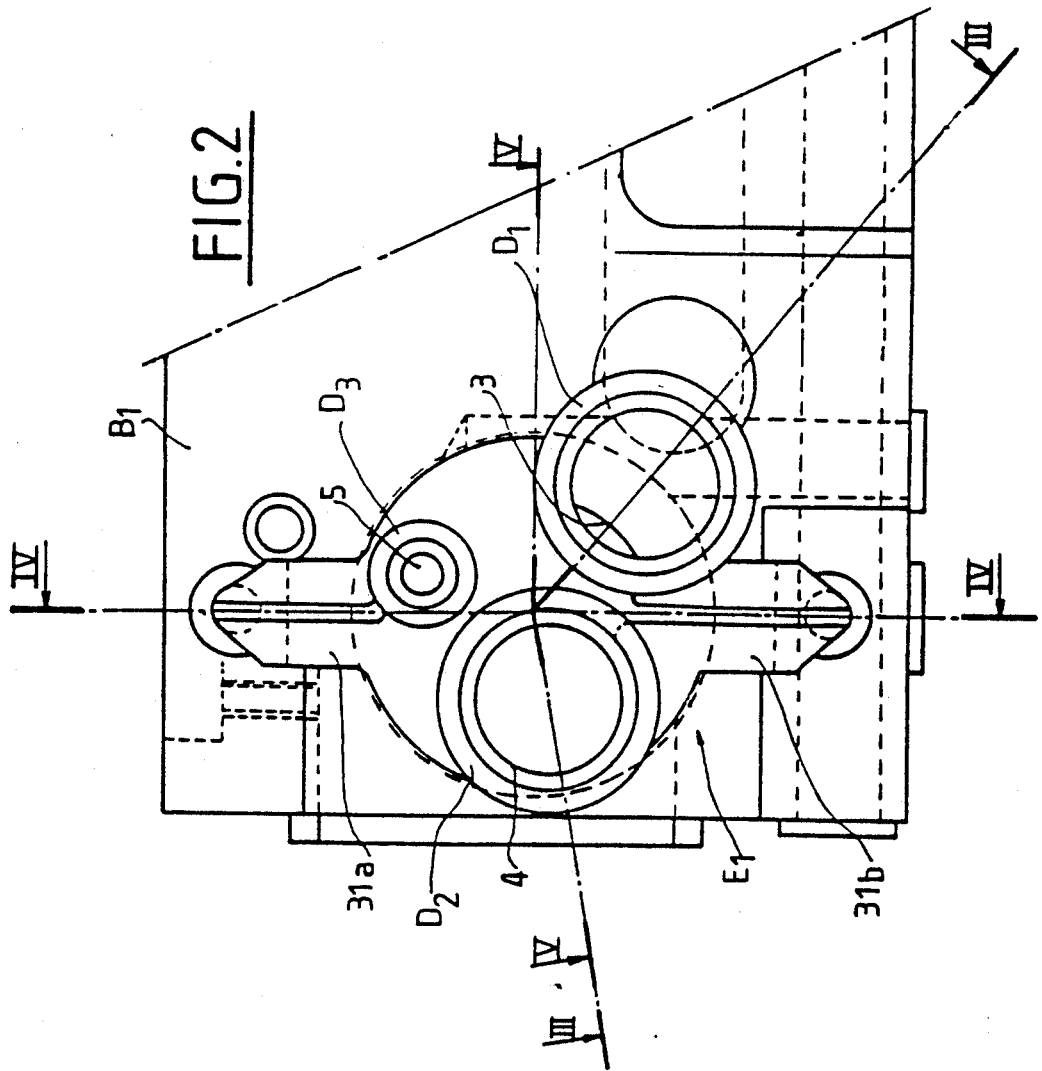
FIG. 2 is an end view of a quick action coupling according to the invention and of a portion of the water box on which it is fitted.
Figure 4:
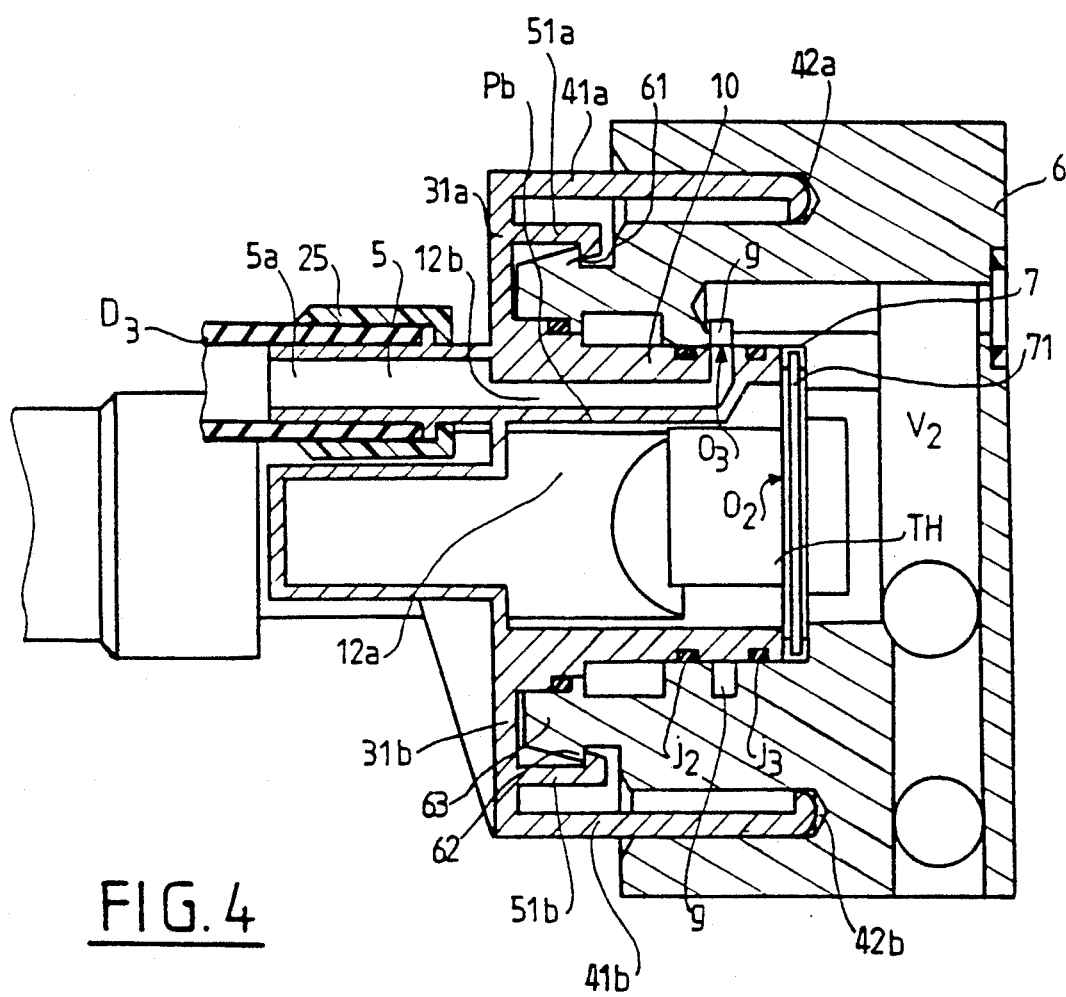

As shown in FIGS. 2, 4 and 7, the base of connector 10, i.e. the portion of said connector which is the closest to the free ends of conduits 3, 4 and 5 has two radial projections 31a, 31b perpendicular to the axis of the connector and which carry centering fingers 41a, 41b, parallel to the axis and adapted to cooperate with blind holes 42a, 42b provided for this purpose on the water box, as well as two resiliently deformable projections or clips 51a, 51b for automatic engagement by clipping into notches with catches 61, 62 formed for this purpose on the end portion 63 of a chimney 6 fast with box $B_1$.

Figure 5:
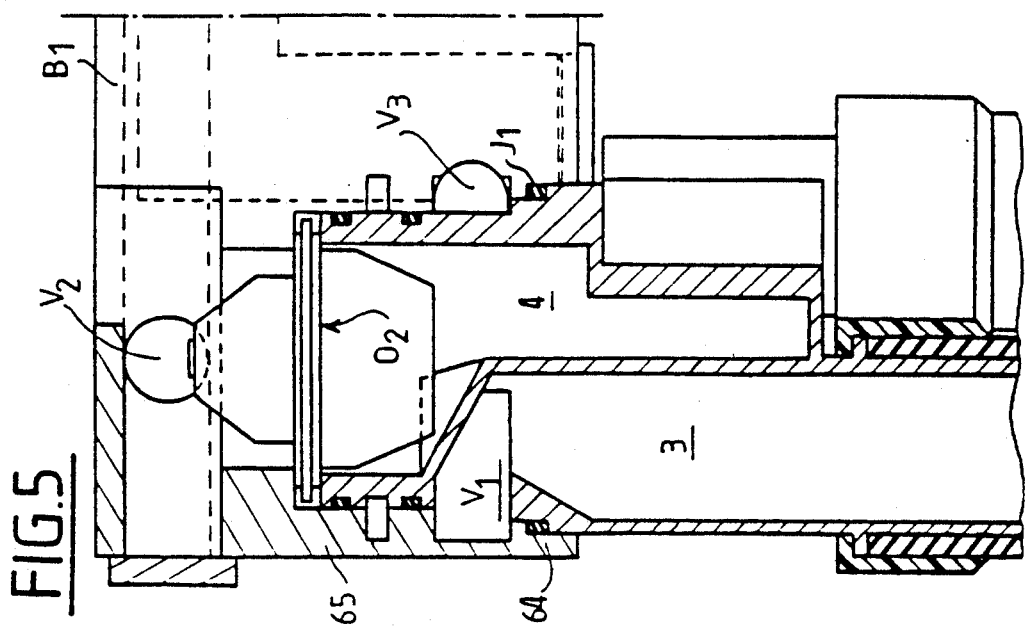
FIGS. 3, 4 and 5 are sectional views through lines III—III, IV—IV, and V—V of FIG. 2.

This chimney 6 into which ways $V_1$, $V_2$ and $V_3$ open at different levels, is profiled so as to receive connector 10 and thus comprises a portion 64 having a cylindrical internal profile of a diameter equal, except for the necessary clearance, to the external diameter of portion 10a of connector 10 and a portion 65, FIG. 5, having an internal diameter corresponding to the external of portion 10b. As illustrated in FIGS. 3 and 4, chimney 6 further comprises a groove 7 in which is fitted the seal 71 of a thermostatic valve the placed in the cooling fluid circuit between way $V_2$ and conduit 4 of connector 10, i.e. immersed in the hot liquid leaving the engine (or recycled into the latter if the opening temperature of the valve is not reached).

To fit the quick action coupling $E_1$ on the water box, it is sufficient to align the axis of connector 10 with that of chimney 6, which alignment is facilitated by engaging fingers 41a and 41b in the holes 42. When the fingers arrive at the bottom of the holes, the resilient clips 51 are locked in notches with catches 61 and 62 and conduits 3, 4, 5 of the coupling are in sealing communication with ways $V_1$, $V_2$ and $V_3$ of the box respectively.

The clamping provided by the clips and the three seals $j_1$, $j_2$, $j_3$ provide sealing of the liquid circuit with respect to the outside and of the cold, hot fluid and degassing tank circuits with respect to each other.

An accidental sealing defect of seals $j_2$ and $j_3$ causes no loss of cooling fluid but only a partial mixing of the circuits, contrary to the collar connection systems, only seal $j_1$ providing sealing of the liquid circuit with respect to the outside.

Besides the chimney 6 described above for cooperating with a three-way coupling $E_1$, water box $B_1$ also comprises members referenced $E_3$ for connecting two ways $V'_1$, $V'_2$ across ways $V_1$ and $V_2$ to the heating radiator $R_2$ by means of a quick action two-way coupling described hereafter with reference to FIGS. 8-11. Such a quick action coupling $E_2$ according to the invention is designed on the same principle as coupling $E_1$, namely it comprises like the latter conduits for fitting hoses and a male connector having centering means and clips which, when fixed on the water box $B_2$ of radiator R, automatically causes connection of the hoses to the inlet and outlet of the cooling fluid in said radiator. However, its structure is simpler because it is only intended for connecting hoses $D_1$ and $D_2$ and so only comprises two flow channels.

Figures 8, 9:
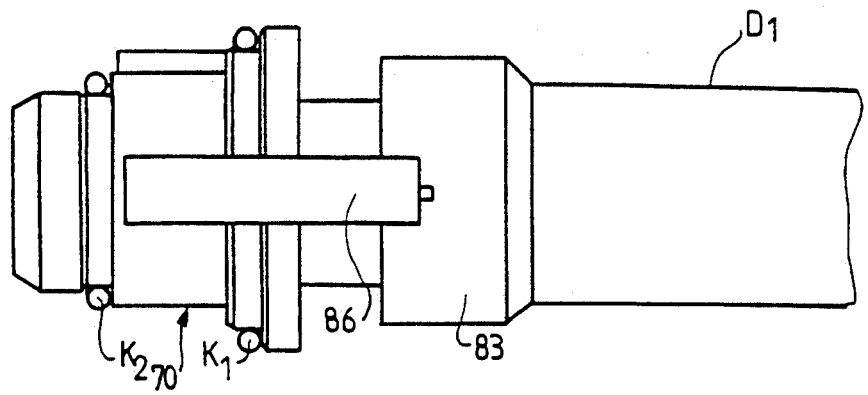
FIG. 8 is a plan view of a quick action coupling according to the invention.
FIG. 9 is a sectional view through line IX—IX of FIG. 11.
Figure 11:
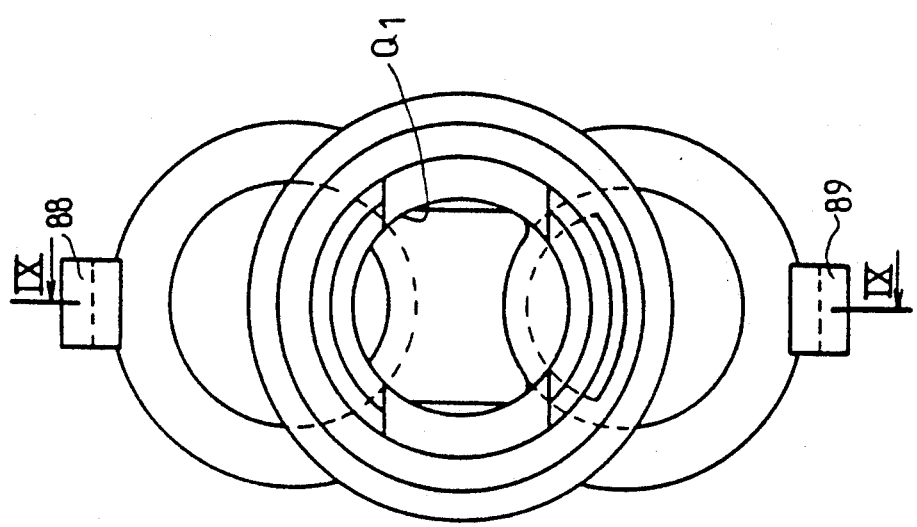
FIGS. 10 and 11 are end views, from the right and left respectively of the device of FIG. 8.
Figure 10:
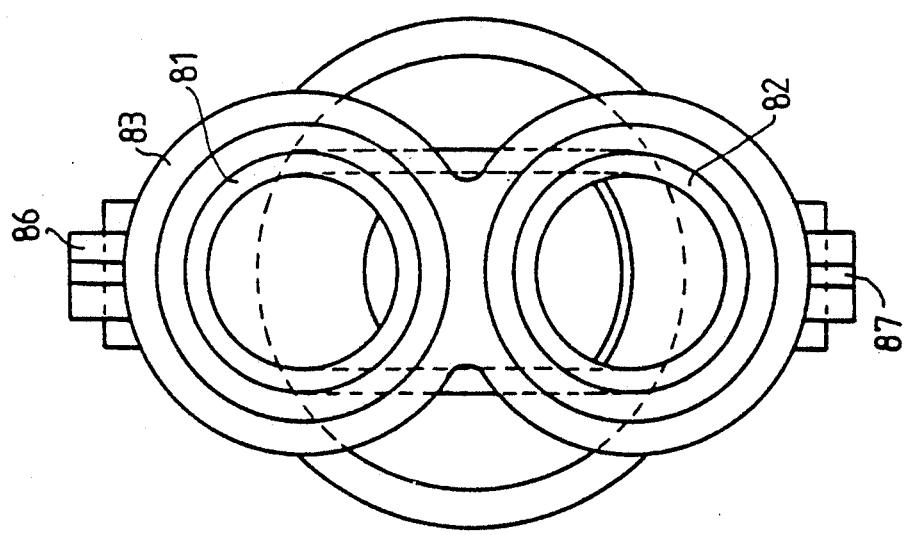

As is clear from FIGS. 8 and 9, it comprises essentially a rigid male connector 70 made from a plastic material and two cooling fluid circulation conduits 81, 82 with parallel axes, connected to the connector, the free ends of the conduits being fast with the hoses fitted thereon by one or more sleeves 83 formed by overmolding.

The sleeve(s) 83 also cover short projections 84 and 85 projecting radially from the external wall of conduits 81 and 82, respectively and which form the base of two resiliently deformable clips 86 and 87 having free ends shaped as hooks 88 and 89 adapted for playing a role similar to clips 51 of the above described embodiment. Similarly to the latter, also, connector 70 comprises a first portion 71 and a second portion 72, of an external diameter less than that of portion 71, in which conduit 82 opens through an orifice $Q_2$ facing a corresponding orifice of female chimney 91 of the water box $B_2$ of radiator R when the coupling is fitted. In the embodiment described and shown, conduit 82 is the one bringing cooling fluid from the engine to the radiator, as shown by arrow f, and which is consequently connected to way $W_2$ or "hot inlet way" of the water box $B_2$. In this latter is also provided a way $W_1$ or "cold outlet way" which, in the fitted condition, communicates with conduit 81 whose outlet orifice $Q_1$ forms the end of portion 72 of connector 70.

The first of two O-seals $k_1$, $k_2$ is placed on the shoulder resulting from the differences of external diameter of portions 71 and 72 and the second in a groove formed in the external surface of said portion 72 of the male connector 70.

The two orifices of the radiator, respectively that for the inlet of hot water and outlet of cold water are located on the same side of the radiator, close to one another, in the water box $B_2$ comprising a female connector 91 having a profile mating with that of connector 70, its portions 96, 97 having internal profiles identical, except for the necessary clearance, respectively to the external profiles of portions 72, 71.

The internal chamber of portion 96 is in communication with the cold way $W_1$ whereas that of portion 97 is in communication with the hot way $W_2$. When connector 70 is fitted in connector 91, the cold way is therefore in exclusive communication with way 81 of the quick action coupling through orifice $Q_1$ whereas the hot way $W_2$ is in communication with way 82 through orifice $Q_2$. As in coupling $E_1$, two centering fingers on the periphery of coupling 70 cooperate with holes on the periphery of the water box of the radiator and two clips, fast with tubes 81 and 82 cooperate with notches on the periphery of this box.

Fitting of coupling $E_2$ on the water box $B_2$ of radiator R is similar to that of coupling $E_1$ on the water box $B_2$ of the engine: after aligning the axes of chimney 91 and connector 70, a simple approaching operation, which can be robotized, causes automatic locking of clips 86, 87 by clipping with mating catches 96 and 97 of box $B_2$ and provides sealed communication of the respective conduits of the coupling and the ways of the water box.

The couplings are advantageously formed by molding a resistant plastic material which does not soften at temperatures of about 100° C. and under the conditions prevailing under the bonnet of the engine.

What is claimed is:

1. A quick action coupling adapted for simultaneously connecting two pipes or hoses to corresponding cooling fluid circuits in a motor vehicle, wherein the cooling fluid circuits open into a generally cylindrical-shaped chimney, said quick action coupling comprising a male connector of a generally cylindrical shape adapted for fitting within the cylindrical-shaped chimney, two rigid conduits formed integral with said male connector and extending therefrom along axes parallel to and laterally spaced apart from one another and parallel to the axis of the cylindrical male connector, each conduit having one end thereof opening into said male connector for communicating with a corresponding cooling fluid circuit opening in the chimney and having an opposite end thereof adapted to connect to a pipe or hose, and a seal provided on said male connector for sealing with an opposing surface of the cylindrical-shaped chimney for preventing fluid loss from said coupling when engaged with the chimney, and at least two spaced clips mounted on said male connector spaced from an outer wall of said male connector and adapted for cooperating with diametrically opposed catches formed on the external surface of the chimney for clamping and locking the connector body to the chimney when the connector body is moved into axial, nonrotatable engagement with the chimney.

2. A quick action coupling according to claim 1 wherein said male connector includes a portion defining an outlet opening for one of said conduits which projects axially beyond the portion defining the outlet opening for the other of said conduits, and including an additional seal mounted on said axially projecting portion of the male connector adapted for sealing with a portion of the chimney defining one of the cooling fluid circuits.

3. A quick action coupling according to claim 1 including a sleeve provided at said opposite end of each conduit for receiving and securing a pipe or hose end onto the conduit.

4. A quick action coupling according to claim 1 wherein said quick action coupling is formed of a rigid plastic material of a composition for withstanding a temperature of about 100° C. without softening.

* * * * *